UNITED STATES PATENT OFFICE.

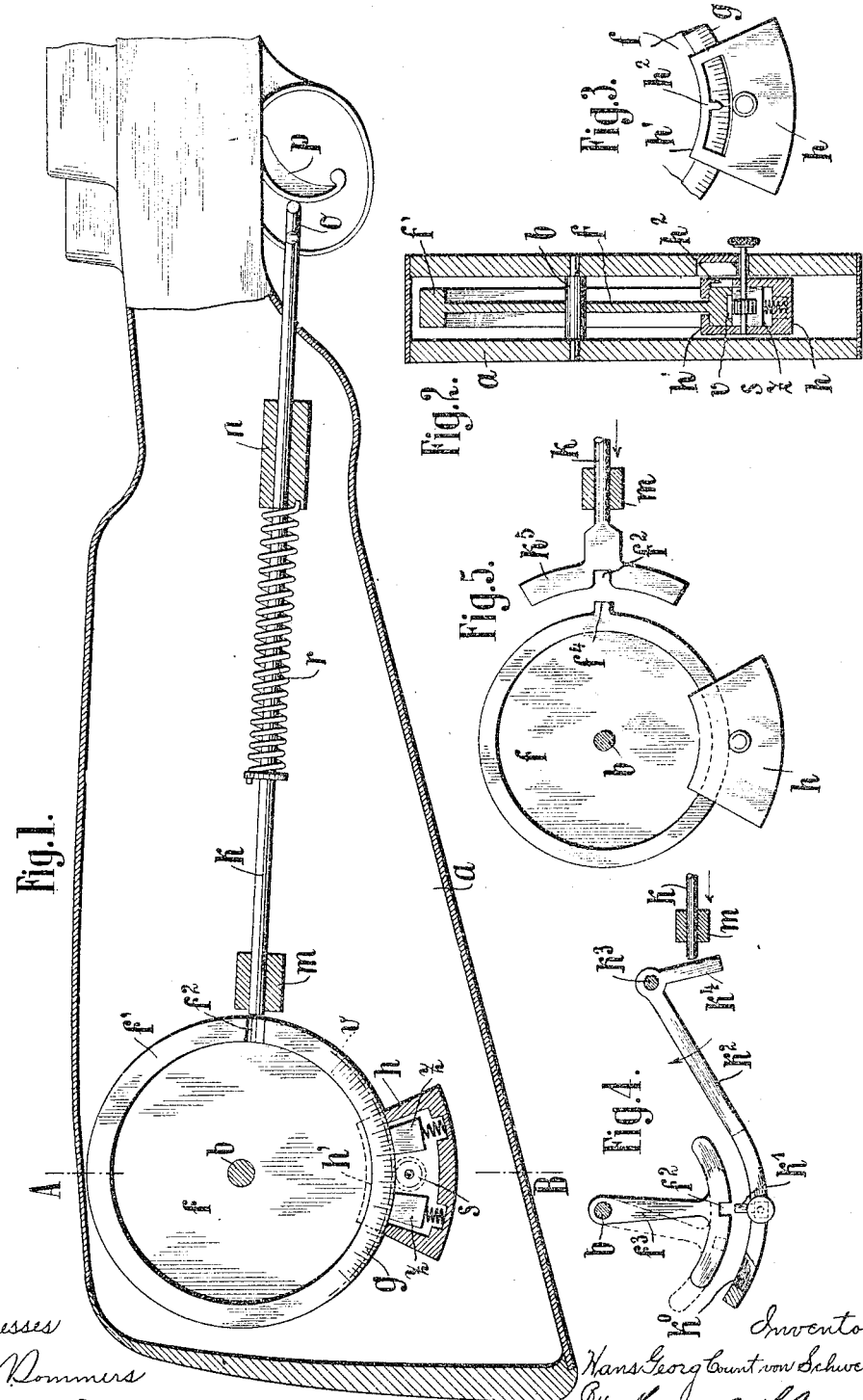

HANS GEORG GRAF VON SCHWEINITZ, OF BERLIN-HALENSEE, GERMANY, ASSIGNOR, BY MESNE ASSIGNMENTS, TO ALFRED MÜLLER, OF CHARLOTTENBURG, GERMANY.

DISCHARGING DEVICE FOR FIREARMS.

995,098. Specification of Letters Patent. Patented June 13, 1911.

Application filed January 20, 1910. Serial No. 539,117.

*To all whom it may concern:*

Be it known that I, HANS GEORG COUNT VON SCHWEINITZ, a subject of the King of Prussia, residing at 144 Kurfürstendamm, Berlin-Halensee, Germany, have invented certain new and useful Improvements in Discharging Devices for Firearms; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a discharging device for fire-arms, in which it is possible to pull the previously locked trigger only in the correct slanting position or elevation of the weapon. My device differs from well-known devices for the same purpose in that it is exceedingly simple it being apparently impossible for the device to break down or become unusable in consequence of a fall or blow with the weapon.

Some illustrative embodiments of my invention are represented by way of example in the accompanying drawing, wherein:—

Figure 1 is a side elevation showing one form of the device, Fig. 2 a section in the plane A—B in Fig. 1, and Fig. 3 a detail; Figs. 4 and 5 show details of two modified forms.

Referring firstly to Figs. 1 to 3, I arrange revolubly on a pin $b$ secured in the butt $a$ of the weapon a disk $f$ having a scale $g$ on a portion of its lateral face. At a corresponding part of the butt I provide an arc-shaped slit, which may be covered by a transparent plate, so that the scale is visible from the outside. The disk $f$ preferably has an enlarged rim $f'$ in which a recess $f^2$ is provided. The rim $f'$ of disk $f$ is clasped by projections $h'$ of a weight or pendulum $h$ in which is journaled a small pinion $s$ adapted to be rotated from the outside and meshing with gear teeth $v$ on the periphery of the disk. The periphery of the disk is preferably roughened so that elastically mounted brake-blocks $z$, for preventing the weight being displaced unintentionally relatively to the disk, and arranged inside the weight $h$ or the like, can secure a good hold on the periphery of the disk. An index $h^2$ provided on weight $h$ is located over the scale $g$. Opposite disk $f$ I arrange a locking rod $k$ movable longitudinally in guides $m$, $n$ and able to coact with the trigger $p$ by means of a movable member $o$. This form of my device is used and operates as follows: When field-firing at 1500 meters, for example, the company or squad will first adjust the scale $g$ in all the weapons by turning pinion $s$ so that the index $h^2$ registers with the point of the scale corresponding to this distance. As soon as the weapon is moved into that slanting position which is requisite for the distance in question, the recess $f^2$ will be opposite rod $k$, which now allows the trigger to be pulled, the free end of the rod entering into said recess. After the weapon has been discharged rod $k$ is automatically returned into its normal position by a spring $r$ coacting with it.

Referring to Fig. 4, the disk and weight shown in Figs. 1 to 3 form a pendulum $f^3$ revoluble around pivot $b$ and having on its bottom side a recess $f^2$. Into this there can enter an adjustable projection $k^1$ of a lever $k^2$ which is fulcrumed at $k^3$ and coacts with its arm $k^4$ with rod $k$, so that when the trigger of the weapon is actuated lever $k^2$ is moved upwardly in the direction of the arrow and the projection $k^1$ enters into the recess $f^2$ when the weapon is held in the correct position. The projection $k^1$ is displaceable, for example, in a slot $k^0$ of lever $k^2$ and can be secured to the latter by a screw, which can be introduced from the side or from below into the carrier of the projection, in order to be able to adjust the projection to different distances of target. The scale of distances is preferably provided on lever $k^2$.

The illustrative embodiment represented in Fig. 5 is a reversal of that represented in Figs. 1 to 3 inasmuch as I provide the recess $f^2$ in the widened end $k^5$ of rod $k$, and I arrange opposite it on the periphery of disk $f$ a projection $f^4$, which enters into recess $f^2$, when the trigger of the weapon is actuated and rod $k$ is moved backward, in the event of the weapon being positioned correctly corresponding to the adjustment at any time of weight $h$.

I claim:—

1. In a device of the character described for preventing the discharging of a fire-arm except when it is in a predetermined position, the combination with the trigger of a rod adapted to coact with the trigger, a pendulum and a weight adjustably mounted on said pendulum, said pendulum normally locking said rod and having a recess allowing the entering of said rod and thereby the pulling of the trigger when the fire-arm is in a predetermined position.

2. In a device of the character described for preventing the discharging of a fire-arm except when it is in a predetermined angular position, the combination with the trigger of a rod adapted to coact with the trigger, a pendulum having gear teeth and normally locking said rod and adapted to release the same in a predetermined position of the fire-arm, a weight adjustably mounted on said pendulum, and a pinion journaled in said weight and meshing with said gear teeth.

3. In a device of the character described for preventing the discharging of a fire-arm except when it is in a predetermined angular position, the combination with the trigger of a rod adapted to coact with the trigger, a pendulum normally locking said rod and adapted to release the same in a predetermined position of the fire-arm, a weight adjustably mounted on said pendulum, and spring-pressed means automatically fixing said weight relatively to said pendulum.

4. In a device of the character described for preventing the discharging of a fire-arm except when it is in a predetermined angular position, the combination with the trigger of a rod adapted to coact with the trigger, a pendulum normally locking said rod and adapted to release the same in a predetermined position of the fire-arm and having a scale on the rim thereof, and a weight adjustably mounted on said pendulum and having a pointer movable over said scale.

In testimony that I claim the foregoing as my invention, I have signed my name in presence of two subscribing witnesses.

HANS GEORG GRAF von SCHWEINITZ.

Witnesses:
JOHANNES HEIN,
WOLDEMAR HAUPT.